United States Patent
Harris et al.

(10) Patent No.: US 11,958,346 B2
(45) Date of Patent: Apr. 16, 2024

(54) TONNEAU COVER WITH RAMP SYSTEM

(71) Applicant: Toyota Motor Engineering & Manufacturing North America, Inc., Plano, TX (US)

(72) Inventors: Ryan C. Harris, Saline, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 109 days.

(21) Appl. No.: 17/682,359

(22) Filed: Feb. 28, 2022

(65) Prior Publication Data

US 2023/0271489 A1 Aug. 31, 2023

(51) Int. Cl.
*B60P 1/43* (2006.01)
*B60J 7/14* (2006.01)
*B60P 3/06* (2006.01)

(52) U.S. Cl.
CPC .............. *B60J 7/141* (2013.01); *B60P 1/43* (2013.01); *B60P 3/06* (2013.01)

(58) Field of Classification Search
CPC ........ B60J 7/141; B60J 7/1607; B60J 7/1621; B60P 1/43; B60P 3/06; B60P 1/431; B60R 5/042; B60R 5/04
USPC ........... 296/100, 100.15, 10, 26, 61, 100.02, 296/100.06; 224/403
See application file for complete search history.

(56) References Cited

U.S. PATENT DOCUMENTS

| | | | |
|---|---|---|---|
| 4,216,990 A * | 8/1980 | Musgrove | B60J 7/041 296/213 |
| 4,874,284 A | 10/1989 | New, Jr. | |
| 5,518,288 A * | 5/1996 | Deklotz | B60J 7/1621 296/10 |
| 5,553,762 A * | 9/1996 | Brown | B60P 1/435 224/558 |
| 6,527,326 B2 | 3/2003 | Henderson | |
| 7,309,202 B1 * | 12/2007 | Anderson | B60P 1/431 224/403 |
| 7,533,923 B1 * | 5/2009 | Caldwell | B60P 1/431 296/61 |
| 7,976,264 B1 * | 7/2011 | Pope | B60P 1/431 414/537 |
| 2001/0033085 A1* | 10/2001 | Bienert | B60R 5/04 296/26.01 |
| 2002/0145299 A1* | 10/2002 | Henderson | B62D 33/04 296/61 |
| 2007/0052257 A1 | 3/2007 | Allen | |

(Continued)

*Primary Examiner* — Joseph D. Pape
(74) *Attorney, Agent, or Firm* — Christopher G. Darrow; Darrow Mustafa PC

(57) ABSTRACT

A tonneau cover for a vehicle has a topside and an underside. The tonneau cover also includes a rail system attached to the underside. The tonneau cover also includes a ramp system. The ramp system is slidably engaged with the rail system and is configured to slide out from the underside along the rail system such that a rear end of the ramp system engages a ground surface to create a rampway between the topside and the ground surface. The ramp system can be used to load large cargo onto the topside of the tonneau cover. The ramp system is also removable from the rail system and attachable to an end of a truck bed of the vehicle such that the ramp system can be used to load cargo into the truck bed.

12 Claims, 3 Drawing Sheets

(56) References Cited

U.S. PATENT DOCUMENTS

| | | | | |
|---|---|---|---|---|
| 2013/0094931 A1* | 4/2013 | Bluhm | .................... | B60P 1/431 |
| | | | | 414/523 |
| 2015/0367768 A1* | 12/2015 | Verwys | .................... | B60P 1/43 |
| | | | | 414/537 |
| 2016/0144759 A1* | 5/2016 | DiBlasio | ................. | B60P 1/435 |
| | | | | 414/537 |

* cited by examiner

TONNEAU COVER WITH RAMP SYSTEM

TECHNICAL FIELD

The embodiments disclosed herein relate to a tonneau cover and, more particularly, to a tonneau cover having a ramp system for loading cargo onto the tonneau cover or into a bed of a truck.

BACKGROUND

Some vehicles, such as pickup trucks, include open-topped beds used to carry various types of cargo. These vehicles can also include removable and/or stowable tonneau covers that can provide protection for cargo within a bed of the vehicle when attached to the bed and that can provide access to a cargo bed when removed.

SUMMARY

Disclosed herein are embodiments of a tonneau cover for a vehicle. In one aspect, a tonneau cover has a topside and an underside. The tonneau cover also includes a rail system attached to the underside. The tonneau cover also includes a ramp system. The ramp system is slidably engaged with the rail system and is configured to slide out from the underside along the rail system such that a rear end of the ramp system engages a ground surface to create a rampway between the topside and the ground surface. These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a tonneau cover for a vehicle. The tonneau cover has a topside and an underside and includes a rail system attached to the underside. The tonneau cover also includes a ramp system slidably engaged with the rail system that is configured to slide out from the underside along the rail system such that a rear end of the ramp system engages a ground surface to create a rampway between the topside and the ground surface. The rampway can be used to load large cargo onto the topside of the tonneau cover. When the tonneau cover is removed from the vehicle and the ramp system is removed from the rail system, the ramp system can be configured to engage a ground surface to create a rampway between the bed and the ground surface so that the rampway can be used to load large cargo into the bed.

Figure 1:
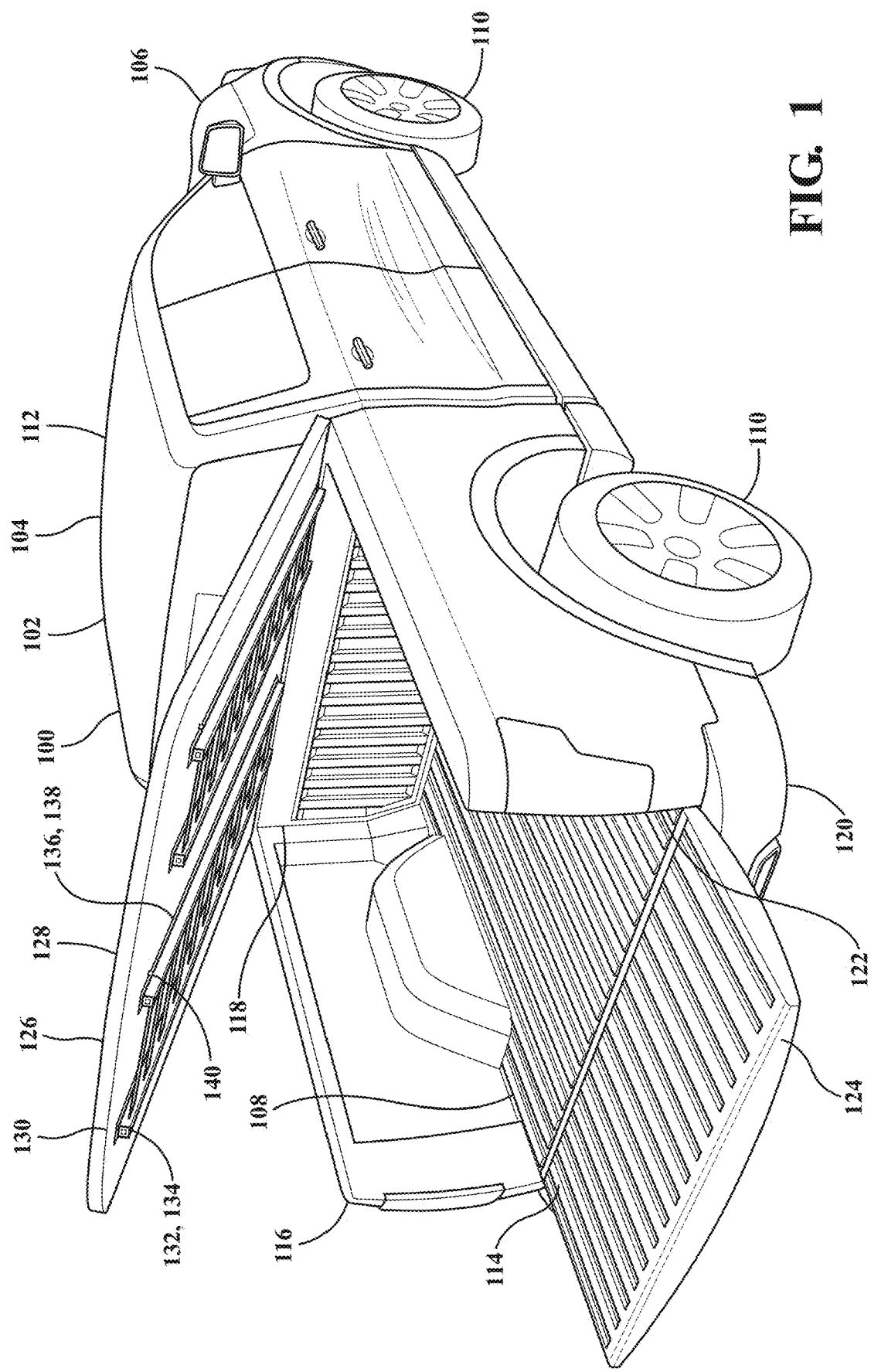
FIG. 1 is an example of a vehicle having a tonneau cover including a ramp system slidably engaged with a rail system.

A representative passenger vehicle 100 is shown in FIG. 1. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100. As shown, the vehicle is a pickup truck.

The vehicle 100 includes an exterior 102 and a number of interior compartments. The compartments include a passenger compartment 104, an engine compartment 106, and an open-topped bed 108 for carrying cargo. Among other things, the vehicle 100 may include seats, a dash assembly, an instrument panel, controls, and the like housed in the passenger compartment 104. Additionally, the vehicle 100 may include an engine, a motor, a transmission, and the like, as well as other powertrain components, such as wheels 110, housed in the engine compartment 106 and elsewhere in the vehicle 100. The wheels 110 support the remainder of the vehicle 100 on the ground. One, some, or all of the wheels 110 are powered by the remainder of the powertrain components to drive the vehicle 100 along the ground.

The vehicle 100 includes a body 112 that forms the exterior 102 and defines or otherwise encloses the bed 108 and other compartments. In relation to the bed 108, the body 112 includes a deck 114, two sides 116, a bulkhead 118, and a rear end 120. Additionally, in relation to the passenger compartment 104 and the engine compartment 106, the vehicle 100 may include a floor forward of the deck 114, a partition forward of the bulkhead 118, a front end, a roof, a hood, and the like. At the rear end 120, the body 112 defines a tailgate opening 122. Similarly to other openings that open between the compartments and the exterior 102, the tailgate opening 122 opens between the bed 108 and the exterior 102. Relatedly, as part of the rear end 120, the body 112 includes a tailgate 124 corresponding to the tailgate opening 122. Similarly to other closure panels that correspond to other openings, the tailgate 124 is pivotally connected to the remainder of the body 112 for movement, relative to the tailgate opening 122, between a closed position over the tailgate opening 122 and an open position away from the tailgate opening 122.

The vehicle 100 also includes a tonneau cover 126. The tonneau cover 126 can be a typical tonneau cover 126 that a user of the vehicle 100 can use to secure cargo in the bed 108 and/or protect cargo in the bed 108 from an external environment of the vehicle 100. The tonneau cover 126 is configured to rest on top of the bed 108 and cover at least a portion of the bed 108. The tonneau cover 126 can be configured to attach to the sides 116 and/or the tailgate 124 of the vehicle 100 using any suitable attachment device, for example, bolts, clamps, clips, etc. The tonneau cover includes a topside 128 and an underside 130 facing the bed 108. The tonneau cover 126 can be a rigid tonneau cover made from a plastic material or a composite material.

In some instances, a user of the vehicle 100 may want to store cargo in the bed 108, but also might want to store cargo on top of the tonneau cover 126. For example, the topside 128 can be used to store heavy and/or large cargo such as all-terrain vehicles, 4-wheelers, golf carts, motorcycles, bikes, etc. In these instances, it would be advantageous to provide the user with an integrated rampway in order to load this type of cargo onto the tonneau cover 126. Accordingly, the tonneau cover 126 can include one or more rampway components that can be used to create a rampway between a ground surface and the topside 128. The rampway components can be attached to the underside 130 and/or otherwise stored underneath the tonneau cover 126.

The rampway components can include a ramp system 132. The ramp system 132 can be stored underneath the tonneau cover 126. The ramp system 132 can include one or more ramps 134. The rampway components can also include a rail system 136. The rail system can include one or more rails 138 attached to the underside 130 of the tonneau cover 126. The ramp system 132 can be slidably engaged with the rail system 136 such that the ramp system 132 is stored within the rail system 136 when stored under the tonneau cover 126 and when not in use. In one example, as shown, the rail system 136 includes a pair of rails 138 and the ramp system 132 includes a pair of ramps 134 slidingly engaged with the pair of rails 138. In other examples, the rail system 136 can include a single rail 138 and the ramp system 132 can include a single ramp 134 slidingly engaged with the rail 138. In other examples, the rail system 136 can include any suitable number of rails 138 and the ramp system 132 can include any suitable number of ramps 134. In any of these examples, the rail(s) 138 are configured to run lengthwise in relation to the bed 108. The rail(s) 138 can be C-channel rails, and each rail 138 can include a stop-release mechanism 140. The stop-release mechanism 140 can be configured to prevent the ramp(s) 134 from sliding out of the rail(s) 138, for example, when the ramp system 132 is not in use. The stop-release mechanism 140 can also be configured to keep the ends of the ramps 134 within the rail system 136 when the ramp system 132 is fully extended out from underneath the tonneau cover 126. The stop-release mechanism 140 can be a button or any other suitable type of mechanism.

Figure 2:
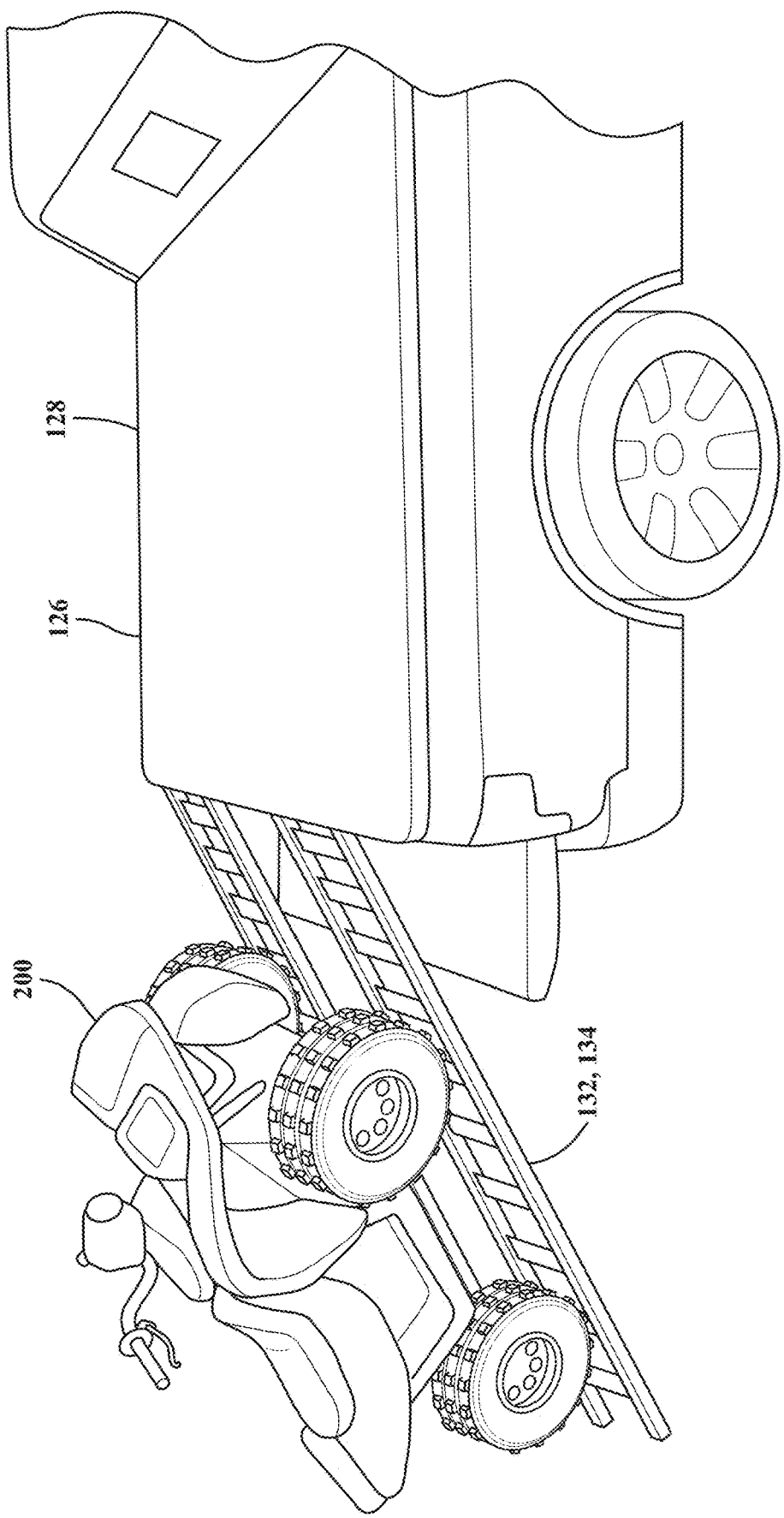
FIG. 2 is an example of the ramp system being used to load cargo onto a topside of the tonneau cover.

Referring to FIG. 2, the ramp system 132 is configured to slide out from under the tonneau cover 126 along the rail system 136. When the ramp system 132 is fully extended out from under the tonneau cover 126, it can be rotated toward the ground so that an end of the ramp system engages the ground surface and creates a rampway to the topside 128 of the tonneau cover 126. As shown, the rampway can be used to load an all-terrain vehicle (ATV) 200 onto the topside 128 of the tonneau cover 126.

Figure 3:
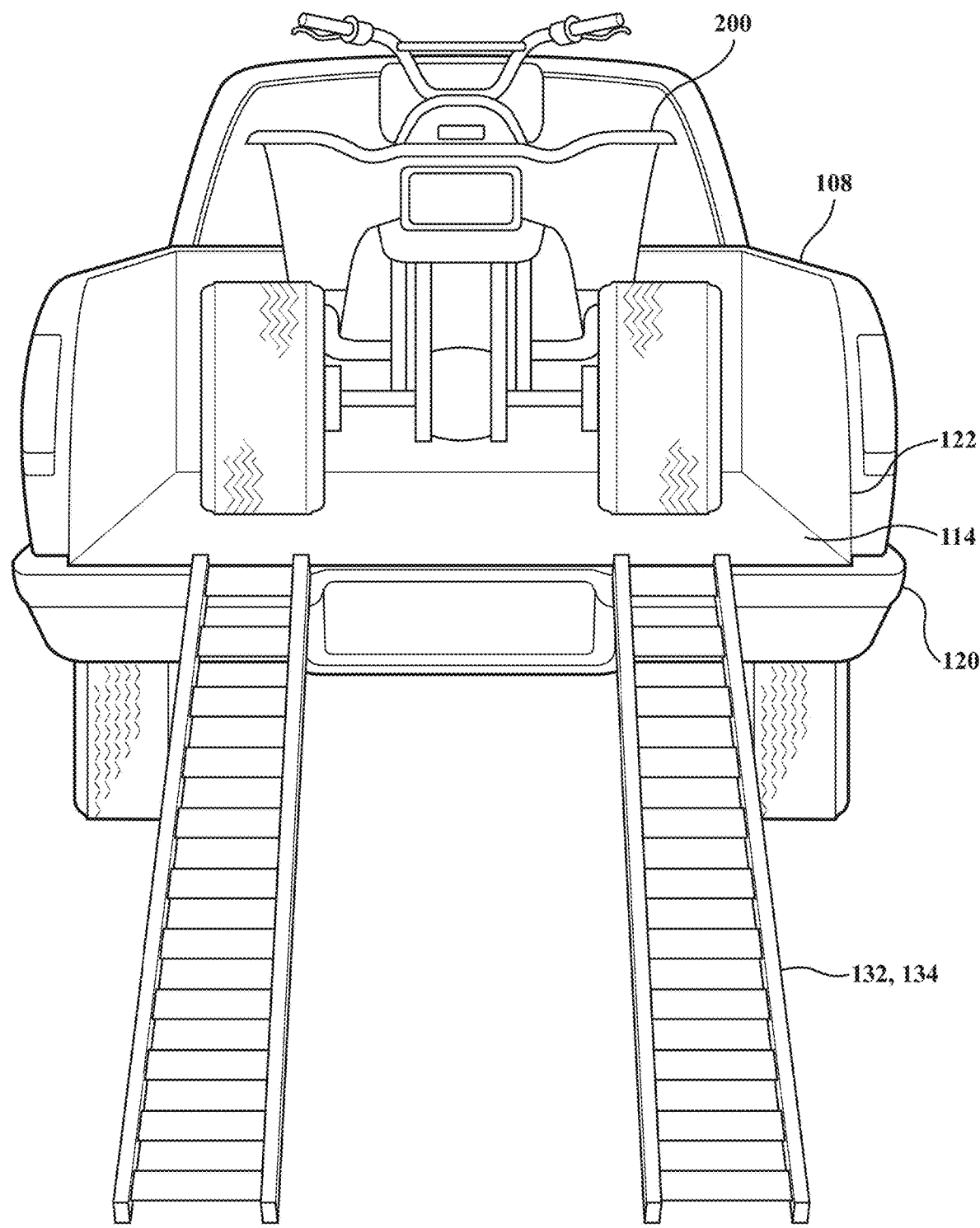
FIG. 3 is an example of the ramp system being used to load cargo into a bed of the vehicle.

While the ramp system 132 can be used to load cargo onto the topside 128 of the tonneau cover, as shown in FIG. 2, the ramp system 132 can also be used to load cargo into the bed 108 itself when the tonneau cover 126 is not attached to the vehicle 100. Referring to FIG. 3, the ramp system 132 can be removed from the rail system 136 and the tonneau cover 126 and attached to the rear end 120 of the vehicle 100. For example, the ramp system 132 can be attached to the deck 114 of the bed 108 at the tailgate opening 122. Accordingly, the ramp system 132 can create a rampway between a ground surface and the bed 108.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tonneau cover for a vehicle, comprising:
   a topside and an underside;
   a rail system attached to the underside; and
   a ramp system slidably engaged with the rail system, wherein the ramp system slides out from the underside along the rail system such that, when the ramp system is slid out from the underside, a front end of the ramp system is located above a tailgate opening of the vehicle, wherein the front end is detachable from the tonneau cover and attachable to the tailgate opening, and wherein a rear end of the ramp system engages a ground surface to create a rampway between the tailgate opening and the ground surface to enable a user to load cargo into a bed of the vehicle through the tailgate opening.

2. The tonneau cover of claim 1, wherein, when the tonneau cover is attached to the vehicle, the ramp system can be used to load cargo onto the topside.

3. The tonneau cover of claim 2, wherein the tonneau cover is removed from the vehicle when the ramp system is used to load cargo into the bed.

4. The tonneau cover of claim 1, wherein the rail system includes a C-channel rail.

5. The tonneau cover of claim 1, wherein the rail system includes a stop-release mechanism configured to prevent the ramp system from sliding out of the rail system.

6. The tonneau cover of claim 5, wherein the stop-release mechanism can be released to allow the ramp system to slide out of the rail system.

7. The tonneau cover of claim 1, wherein the ramp system is removable from the rail system.

8. The tonneau cover of claim 7, wherein the cargo is at least one of an all-terrain vehicle, a golf cart, a motorcycle, and a bike.

9. The tonneau cover of claim 1, wherein the rail system includes a pair of rails, and the ramp system includes a pair of ramps slidingly engaged with the pair of rails.

10. The tonneau cover of claim 9, wherein each of the pair of rails is a C-channel rail.

11. The tonneau cover of claim 9, wherein each of the pair of rails includes a stop-release mechanism configured to prevent the ramps from sliding out of the rails.

12. The tonneau cover of claim 11, wherein each stop-release mechanism can be released to allow the ramps to slide out of the rails.

* * * * *